United States Patent
Huang et al.

(10) Patent No.: US 6,501,648 B2
(45) Date of Patent: Dec. 31, 2002

(54) SELF-STABILIZING HEAT EXHAUST SYSTEM

(75) Inventors: Wen-Shi Huang, Taoyuan Hsien (TW); Kuo-Cheng Lin, Taoyuan (TW); Shou-Te Yu, Taoyuan (TW); Ming-Shi Tsai, Taipei Hsien (TW)

(73) Assignee: Delta Electronics Inc., Taoyuan Sien (TW)

( * ) Notice: Subject to any disclaimer, the term of this patent is extended or adjusted under 35 U.S.C. 154(b) by 25 days.

(21) Appl. No.: 09/859,420

(22) Filed: May 18, 2001

(65) Prior Publication Data

US 2002/0063478 A1 May 30, 2002

(30) Foreign Application Priority Data

Aug. 5, 2000 (TW) .......................................... 89115759

(51) Int. Cl.[7] ................................................. H05K 5/00
(52) U.S. Cl. ........................................ 361/687; 361/695
(58) Field of Search ......................... 361/51, 676, 683, 361/687, 688, 690, 695

(56) References Cited

U.S. PATENT DOCUMENTS

| 4,702,154 A | * | 10/1987 | Dodson ............................ 98/1 |
| 5,949,646 A | * | 9/1999 | Lee et al. .................... 361/695 |
| 6,141,213 A | * | 10/2000 | Autonuccio et al. ......... 361/687 |

* cited by examiner

Primary Examiner—Matthew Nguyen
(74) Attorney, Agent, or Firm—Birch, Stewart, Kolasch & Birch, LLP

(57) ABSTRACT

The present invention discloses a self-stabilizing heat exhaust system including at least several rate-variable fans. Each of the rate-variable fans further includes a power-input terminal for inputting power to the rate-variable fans; a grounded terminal for providing the rate-variable fan a lower level; a signal-output terminal coupled to an adjacent rate-variable fan for outputting a speed signal which may be a normal signal or an abnormal signal; a signal-input terminal coupled to another adjacent rate-variable fan for receiving the speed signal; and a control circuit responding to the abnormal signal to make the rate-variable fan rotate at the higher rotation rate and responding to the normal signal to make the rate-variable fan rotate at the lower rotation rate.

14 Claims, 3 Drawing Sheets

SELF-STABILIZING HEAT EXHAUST SYSTEM

BACKGROUND OF THE INVENTION

1. Field of the Invention

The present invention relates to a heat exhaust system, and more particularly to a self-stabilizing heat exhaust system.

2. Description of the Prior Art

As the electric device progresses in performance, a heat exhaust system becomes indispensable for dissipating the heat generated by the electric device. The heat generated by the electric device should be properly dissipated, otherwise the performance may be encumbered with the accumulated heat or the worst burns the electric devices. For example, a computer may be equipped with a heat exhaust system including several fans for dissipating the heat generated by a CPU or a power supply. The heat exhaust system is connected to the control port of the computer, and controlled by the control circuit built in the computer. Once some fan is failed, if the other normal fans in the system do not compensate the decreased heat exhaust ability as soon as possible, the result may be terrible.

A conventional heat exhaust system shown in FIG. 1 includes a heat-generating device 10, such as a computer, and several fans 30, such as a first fan 30a, a second fan 30b and a third fan 30c. Among these, the heat-generating device 10 further includes a control circuit 20, such as a logic control circuit. The control circuit 20 has a speed signal input terminal 21, a speed control terminal 22. The fan 30 has a power-input terminal 31, a grounded terminal 32, a signal-output terminal 33(O/P) and a signal-input terminal 35(I/P).

Still referring to FIG. 1, each signal-output terminal 33 of the fan 30 is electrically connected to the speed signal input terminal 21 of the control circuit 20. Therefore, the control circuit 20 can receive a speed signal representing that the rotation rate of the fan 30 is normal or abnormal. In general, if the rotation rate is normal, the speed signal is a high-level signal. On the contrary, if the rotation rate is abnormal, the speed signal is a low-level signal. However, the low-level signal may indicate that the rotation rate is normal, and the high-level signal may indicate that the rotation rate is abnormal. The signal-input terminal 35 of the fan 30 is electrically connected to the speed control terminal 22 of the control circuit 20. Therefore, the control circuit 20 can send a speed control signal to the fan 30a–c to control the speed of the fan.

Still referring to FIG. 1, when some fan, such as the first fan 30a, is failed, the control circuit 20 received an abnormal signal from the failed fan 30a. Then, the control circuit 20 sends a signal to the second fan 30b and the third fan 30c to increase the rotation rate of the fans 30b and 30c. In this manner, the decreased heat exhaust ability, caused by the failed first fan 30a, can be compensated by the higher rotation rate provided by the normal fans.

According to the above-mentioned conventional heat exhaust system, it is understood that the heat-generating device 10, such as the computer, detects which fan is failed and then the external control circuit activates the compensation. That is, the conventional heat exhaust system itself cannot detect and self-control whether the speed of the fan should be increased or not. The conventional heat exhaust system inherently includes several disadvantages as follows.

First, the complexity of the heat-generating device is increased due to the addition of the heat exhaust system. An external control circuit, such as a logic control circuit, is required and thus built in the heat-generating device. As increase in the number of fans, the fan-out ability of the logic control circuit should be increased at the same time. As a result, the cost of the logic control circuit is increased.

Therefore, there is a need in the art for resolving the above disadvantages.

SUMMARY OF THE INVENTION

Therefore, the main object of the present invention is to provide a novel heat exhaust system can overcome the aforementioned problems. Besides, the above object of the present invention is achieved by a self-stabilizing heat exhaust system.

The present invention disclosed a self-stabilizing heat exhaust system including a plurality of devices for exhausting heat, such as fans. When all the fans are normal, each of the fans rotates at lower rotation rate. Once some fan fails, an adjacent fan will be switched to rotate at a higher rotation rate. For example, the value of the higher rotation rate may be two times of that of the lower rotation rate. Alternatively, the remaining fans start to rotate at the higher rotation rate so as to compensate the decreased exhaust ability. That is, the system of the present invention responds to the failed fan and then increases the exhaust ability of the normal fans. Thus, the inlet airflow and the outlet airflow can be kept steadily. Therefore, the heat-generating device, such as a computer, connected to the present system substantially does not experience problem in heat exhaust. Especially, the present invention does not need to co-operate with an external logic control circuit. That is, the present invention does not need to be connected to any logic control circuit built in the computer via a control port because the fan of the present system is able to detect the condition of each other and then vary the rotation rate by itself.

In sum, the present system is independent of the heat-generating device. There is free of any connection between the present system and the heat-generating device. Therefore, the complexity of the heat-generating device can be reduces significantly.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention disclosed a self-stabilizing heat exhaust system including a plurality of devices for exhausting heat, such as fans. When all the fans are normal, each of the fans rotates at a lower rotation rate. Once some fan has a failure, an adjacent fan will be switched to rotate at a higher rotation rate. For example, the value of the higher rotation rate may be two times of that of the lower rotation rate. Alternatively, the remaining fans rotate at the higher rotation rate to compensate the decreased exhaust ability. That is, the system of the present invention responds to the failed fan and then increases the exhaust ability of the normal fans. Thus, the inlet airflow and the outlet airflow can be kept steadily. Therefore, the heat-generating device (i.e. a computer) connected to the present system substantially does not experience problem in heat exhaust.

Especially, for the present invention, an external logic control circuit for controlling the exhaust system is not required. That is, the present invention does not need to be connected to an external logic control circuit. For example, the present invention does not need to be connected to the logic control circuit, built in the computer, via a control port because the fan of the present system is able to detect, respond to the condition of each other and then vary the rotation rate by itself.

Figure 1:
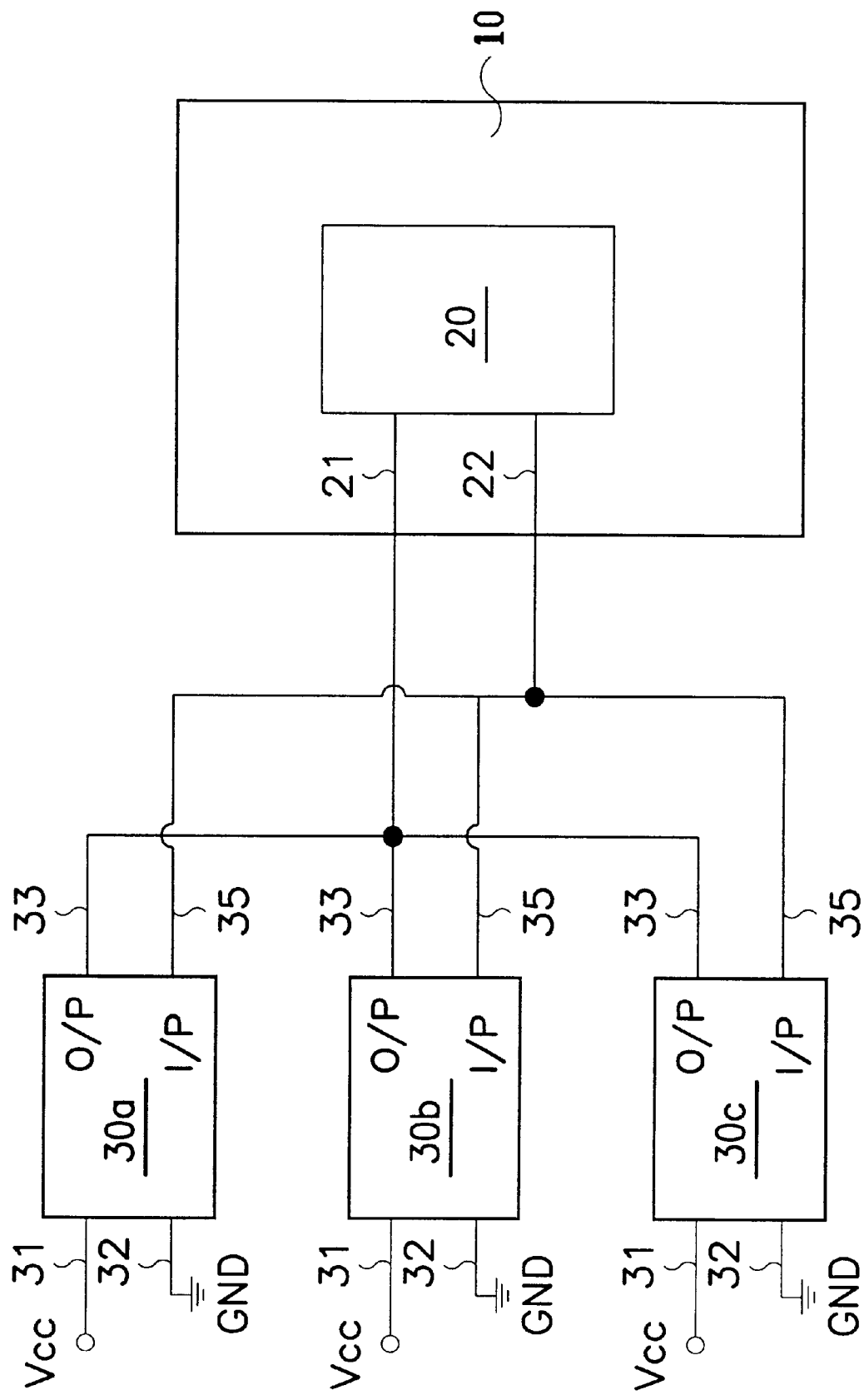
FIG. 1 depicts a conventional heat exhaust system associated with a heat-generating device.
Figure 2:
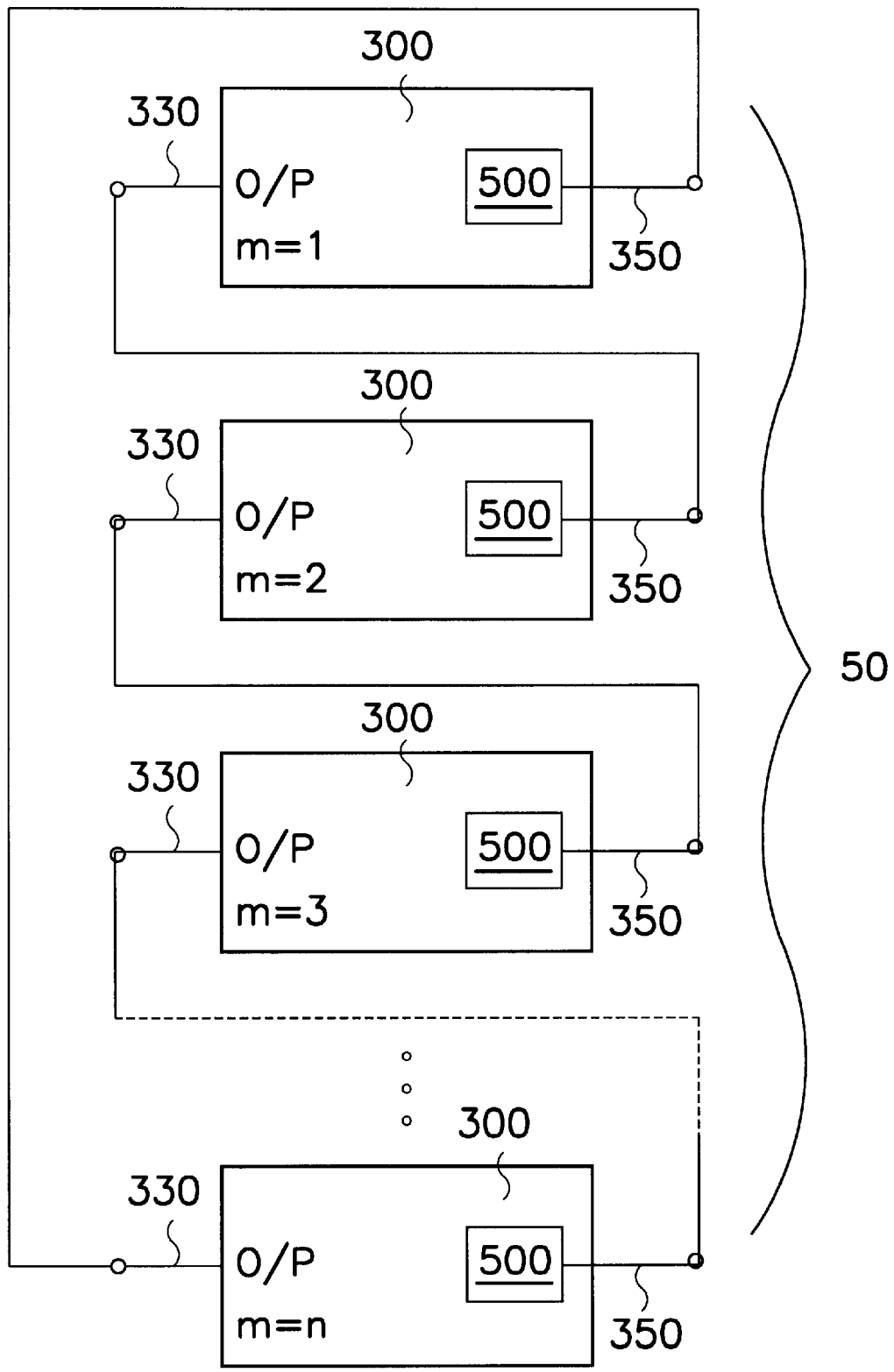
FIG. 2 depicts the block diagram of an embodiment of the present invention.

The block diagram shown in FIG. 2 depicts the first embodiment of the present invention. As shown in FIG. 2, the self-stabilizing heat exhaust system 50 includes n rate-variable fans 300, wherein n is a natural number and $n \geq 2$. In any case, the rate-variable fan 300 is able to rotate at a higher rotation rate or a lower rotation rate. That is, the fan 300 is at least a dual-rate fan. In the first embodiment of the present invention, the higher rotation rate is the double of the lower rotation rate. However, any suitable multiples also can be used. In the present system, each fan has a power-input terminal (not shown), a grounded terminal (not shown), a $m_{th}$ signal-output terminal (O/P) 330, a $m_{th}$ signal-input terminal 350 and a $m_{th}$ control circuit 500, wherein m is from 1 to n, and m is a natural number.

Still referring to FIG. 2, the $m_{th}$ signal-output terminal 330 can output a $m_{th}$ speed signal. The $m_{th}$ speed signal may be a $m_{th}$ normal signal or a $m_{th}$ abnormal signal. The $m_{th}$ normal signal indicates that the $m_{th}$ fan is normal and $m_{th}$ abnormal signal indicates that the $m_{th}$ fan is abnormal, respectively. If m is not 1, the $m_{th}$ signal-input terminal 350 is coupled to the $m-1_{th}$ signal-output terminal 330. Therefore, the $m_{th}$ signal-input terminal 350 can receive the $m-1_{th}$ speed signal. When m is 1, the $m_{th}$ signal-input terminal 350 is coupled to the $n_{th}$ signal-output terminal 330. Therefore, the $m_{th}$ signal-input terminal 350 can receive the $n_{th}$ speed signal.

Still referring to FIG. 2, when m is not 1, the $m_{th}$ control circuit 500 responds to the $m-1_{th}$ abnormal signal to make $m_{th}$ rate-variable fan 300 rotate at the higher rotation rate. Additionally, the $m_{th}$ control circuit 500 responds to the $m-1_{th}$ normal signal to make $m_{th}$ rate-variable fan 300 rotate at the lower rotation rate. When m is 1, the $m_{th}$ control circuit 500 responds to the $n_{th}$ abnormal signal to make $m_{th}$ rate-variable fan 300 rotate at the higher rotation rate. Additionally, the $m_{th}$ control circuit 500 responds to the $m-1_{th}$ normal signal to make $m_{th}$ rate-variable fan 300 rotate at the lower rotation rate.

That is, when all the fans in the system 50 are normal, each of the fans in the system 50 does not receive any abnormal signal. That is, each of the fans in the system 50 receives the normal signal. However, once some fan (i.e. the first rate-variable fan, m=1) is failed, the failed first rate-variable fan outputs a first abnormal signal to the adjacent rate-variable fan (i.e. the second rate-variable fan, (m=2)) via its signal-output terminal 330. At this time, the control circuit 500 of the second rate-variable fan responds the first abnormal signal to make the second rate-variable fan rotate at the higher rotation rate. In this manner, the decrease in the heat exhaust ability, caused by the failed first rate-variable fan, can be compensated by the higher rotation rate provided by the second rate-variable fan. The value of the higher rotation rate is at least two times of that of the lower rotation rate.

Alternatively, when the $n_{th}$ rate-variable fan (m=n) is failed, the $n_{th}$ rate-variable fan outputs a $n_{th}$ abnormal signal to the first rate-variable fan (m=1) via its signal-output terminal 330. At this time, the control circuit 500 of the first rate-variable fan responds to the $n_{th}$ abnormal signal to make the first rate-variable fan rotate at the higher rotation rate. In this manner, the decrease in the heat exhaust ability, resulted from the failed $n_{th}$ rate-variable fan, can be compensated by the higher rotation rate provided by the first rate-variable fan. The value of the higher rotation rate is at least 2 times of that of the lower rotation rate. That is, once any fan in the system 50 is failed, one of the fans electrically connected to the failed fan will rotate at higher rotation rate.

Figure 3:
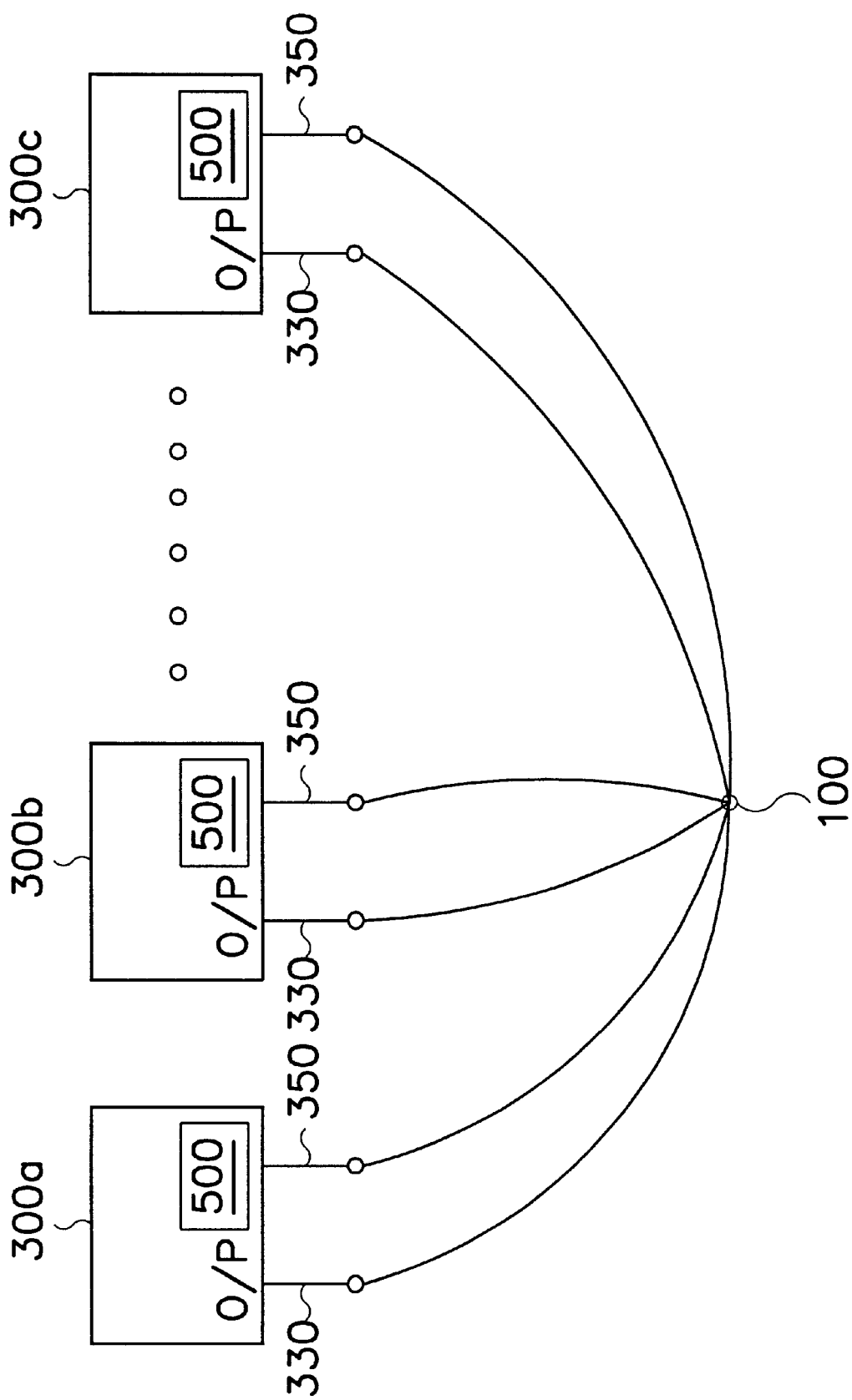
FIG. 3 depicts the block diagram of another embodiment of the present invention.

The second embodiment of the present invention is illustrated in FIG. 3. As shown in the FIG. 3, the self-stabilizing heat exhaust system 50 includes a joint 100 and includes at least two rate-variable fans 300. For example (but not limited) a first rate-variable fan 300a, a second rate-variable fan 300b and a third rate-variable fan 300c are included. In any case, the rate-variable fan 300 can rotate at a higher rotation rate or a lower rotation rate. That is, the fan 300 at least includes a dual-rate fan. Each of the fans has a power-input terminal (not shown), a grounded terminal (not shown), a signal-output terminal (O/P) 330, a signal-input terminal 350 and a control circuit 500. Because the functions of the foregoing terminals are identical to the description in the first embodiment, unnecessary description is omitted.

Still referring to FIG. 3, all signal-output terminals 330 are coupled to the joint 100. The signal-output terminal 330 outputs a speed signal. The speed signal may be a normal signal or an abnormal signal. The normal signal indicates that the fan outputting such a signal is normal and the abnormal signal indicates that the fan outputting such a signal is abnormal. In addition, all the signal-input terminals 350 are coupled to the joint 100 so that the signal-input terminals 350 can receive the speed signal. Via the signal-input terminals 350, the control circuit 500 can receive and then respond to the abnormal signal to make the rate-variable fan 300 rotate at the higher rotation rate. Similarly, the control circuit 500 can receive and then respond to the normal signal to make the rate-variable fan 300 rotate at the lower rotation rate.

Still referring to FIG. 3, when some fan, such as the first fan 300a, in the system 50 is failed, the first fan 300a outputs an abnormal signal via its signal-output terminal 330. At this time, the signal-input terminals 350 of the rest of the fan(s), such as the second fan 300b and the third fan 300c, receive the abnormal signal. Then, both of the control circuits 500 of the second fan 300b and the third fan 300c, respond to the abnormal signal to make the second fan 300b and the third fan 300c rotate at the higher rotation rate. In this manner, the decrease in the heat exhaust ability, caused by the failed first fan 300a, can be compensated by the higher rotation rate provided by the second fan 300b and the third fan 300c.

The system disclosed by the present invention can be electrically independent of the heat-generating device. That is, there is no any electrical connection between the present system and the heat-generating device. Any external control circuit is not required. Therefore, the complexity of the heat-generating device can be reduced. Furthermore, in the present invention, the control circuit 500 controls the corresponding fan so that it is not necessary to increase the fan-out ability of the control circuit 500 if the number of the fan increases.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A self-stabilizing heat exhaust system, comprising:
   n rate-variable fans, wherein n is a natural number and n≧2, said rate-variable fan further comprising:
   a $m_{th}$ signal-output terminal, wherein m is from 1 to n as well as m and n are natural number, said $m_{th}$ signal-output terminal outputting a $m_{th}$ speed signal, said $m_{th}$ speed signal being a $m_{th}$ normal signal or a $m_{th}$ abnormal signal, said $m_{th}$ normal signal representing that the $m_{th}$ fan is normal, said $m_{th}$ abnormal signal representing that the $m_{th}$ fan is abnormal;
   a $m_{th}$ signal-input terminal, when m being not 1, said $m_{th}$ signal-input terminal being coupled to a $m-1_{th}$ signal-output terminal, said $m_{th}$ signal-input terminal being used to receive said $m-1_{th}$ speed signal, when m being 1, said $m_{th}$ signal-input terminal being coupled to a $n_{th}$ signal-output terminal, said $m_{th}$ signal-input terminal being used to receive said $n_{th}$ speed signal; and
   a $m_{th}$ control circuit, when m being not 1, said $m_{th}$ control circuit responding to a $m-1_{th}$ abnormal signal to make said $m_{th}$ rate-variable fan rotate at a higher rotation rate, said $m_{th}$ control circuit responding to said $m-1_{th}$ normal signal so as to make said $m_{th}$ rate-variable fan rotate at a lower rotation rate, when m being 1, said $m_{th}$ control circuit responding to said $n_{th}$ abnormal signal to make said $m_{th}$ rate-variable fan rotate at said higher rotation rate, said $m_{th}$ control circuit responding to said $m-1_{th}$ normal signal to make said $m_{th}$ rate-variable fan rotate at said lower rotation rate.

2. The self-stabilizing heat exhaust system according to claim 1, wherein said higher rotation rate is at least the double of said lower rotation rate.

3. The self-stabilizing heat exhaust system according to claim 1, wherein said rate-variable fan further comprises:
   a power-input terminal for inputting power to said rate-variable fans; and
   a grounded terminal for providing said rate-variable fan a lower level.

4. The self-stabilizing heat exhaust system according to claim 1, wherein said rate-variable fan comprises a dual-rate fan.

5. The self-stabilizing heat exhaust system according to claim 1, wherein said rate-variable fan comprises a DC fan.

6. A self-stabilizing heat exhaust system, comprising:
   n dual-rate fans, wherein n is a natural number and n≧2, said dual-rate fan further comprising:
   a $m_{th}$ signal-output terminal, wherein m is from 1 to n as well as m and n are natural number, said $m_{th}$ signal-output terminal outputting a $m_{th}$ speed signal, said $m_{th}$ speed signal being a $m_{th}$ normal signal or a $m_{th}$ abnormal signal, said $m_{th}$ normal signal representing that the $m_{th}$ fan is normal, said $m_{th}$ abnormal signal representing that the $m_{th}$ fan is abnormal;
   a $m_{th}$ signal-input terminal, when m being not 1, said $m_{th}$ signal-input terminal being coupled to a $m-1_{th}$ signal-output terminal, said $m_{th}$ signal-input terminal being used to receive said $m-1_{th}$ speed signal, when m being 1, said $m_{th}$ signal-input terminal being coupled to a $n_{th}$ signal-output terminal, said $m_{th}$ signal-input terminal being used to receive said $n_{th}$ speed signal; and
   a $m_{th}$ control circuit, when m being not 1, said $m_{th}$ control circuit responding to a $m-1_{th}$ abnormal signal to make said $m_{th}$ rate-variable fan rotate at a higher rotation rate, said $m_{th}$ control circuit responding to said $m-1_{th}$ normal signal so as to make said $m_{th}$ rate-variable fan rotate at a lower rotation rate, when m being 1, said $m_{th}$ control circuit responding to said $n_{th}$ abnormal signal to make said $m_{th}$ rate-variable fan rotate at said higher rotation rate, said $m_{th}$ control circuit responding to said $m-1_{th}$ normal signal to make said $m_{th}$ rate-variable fan rotate at said lower rotation rate.

7. The self-stabilizing heat exhaust system according to claim 6, wherein said higher rotation rate is at least the double of said lower rotation rate.

8. The self-stabilizing heat exhaust system according to claim 6, wherein said dual-rate fan further comprises:
   a power-input terminal for inputting power to said rate-variable fans; and
   a grounded terminal for providing said rate-variable fan a lower level.

9. The self-stabilizing heat exhaust system according to claim 6, wherein said dual-rate fan comprises a DC fan.

10. A self-stabilizing heat exhaust system, comprising:
    a joint;
    at least two rate-variable fans, each of said rate-variable fans further including:
    a signal-output terminal coupled to said joint, said signal-output terminal outputting a speed signal which may be a normal signal or an abnormal signal, said normal signal representing that said rate-variable fan is normal and said abnormal signal representing that said rate-variable fan is abnormal;
    a signal-input terminal coupled to said joint, said signal-input terminal receiving said speed signal; and
    a control circuit, responding to said abnormal signal to make said rate-variable fan rotate at the higher rotation rate, and said control circuit responding to said normal signal to make said rate-variable fan rotate at the lower rotation rate.

11. The self-stabilizing heat exhaust system according to claim 10, wherein said higher rotation rate is at least the double of said lower rotation rate.

12. The self-stabilizing heat exhaust system according to claim 10, wherein said rate-variable fan further comprises:
    a power-input terminal for inputting power to said rate-variable fans; and
    a grounded terminal for providing said rate-variable fan a lower level.

13. The self-stabilizing heat exhaust system according to claim 10, wherein said rate-variable fan comprises a dual-rate fan.

14. The self-stabilizing heat exhaust system according to claim 10, wherein said rate-variable fan comprises a DC fan.

* * * * *